United States Patent
Davis et al.

(10) Patent No.: US 10,910,642 B1
(45) Date of Patent: Feb. 2, 2021

(54) REDOX FLOW BATTERY HAVING LIGAND-METAL COMPLEX

(71) Applicant: Los Alamos National Security, LLC, Los Alamos, NM (US)

(72) Inventors: Benjamin L. Davis, Los Alamos, NM (US); Terry Chu, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 142 days.

(21) Appl. No.: 15/999,036

(22) Filed: Aug. 17, 2018

Related U.S. Application Data

(60) Provisional application No. 62/547,623, filed on Aug. 18, 2017.

(51) Int. Cl.
*H01M 4/60* (2006.01)
*H01M 4/36* (2006.01)
*H01M 8/18* (2006.01)

(52) U.S. Cl.
CPC ............ *H01M 4/368* (2013.01); *H01M 4/60* (2013.01); *H01M 8/188* (2013.01)

(58) Field of Classification Search
CPC ......... H01M 4/368; H01M 4/60; H01M 8/188
See application file for complete search history.

(56) References Cited

U.S. PATENT DOCUMENTS

2014/0239906 A1* 8/2014 Anderson ............. H01M 8/188
320/128

FOREIGN PATENT DOCUMENTS

JP          2003115298 A  *  4/2003  ............ H01M 10/05

OTHER PUBLICATIONS

Machine Translation JP2003115298(A) (Year: 2003).*

* cited by examiner

*Primary Examiner* — Victoria H Lynch
(74) *Attorney, Agent, or Firm* — Klarquist Sparkman, LLP

(57) ABSTRACT

A nonaqueous electrolyte composition for use in a redox flow battery system, comprising a nonaqueous supporting electrolyte and a ligand metal complex as an electrochemically active component.

25 Claims, 10 Drawing Sheets

Conditions: 1 mM Ni(bppn) in CH₃CN with 0.1 M [NBu₄][PF6] at 100 mV/s scan rate

Cycling Ni(bppn) in a H-type cell using 1 mA current rate with potential cut offs of -1.25 and -2.25V

REDOX FLOW BATTERY HAVING LIGAND-METAL COMPLEX

CROSS REFERENCE TO RELATED APPLICATIONS

This application claims priority to U.S. Provisional Application No. 62/547,623, filed Aug. 18, 2017, which is incorporated by reference herein in its entirety.

ACKNOWLEDGEMENT OF GOVERNMENT SUPPORT

This invention was made with government support under Contract No. DE-AC52-06NA25396 awarded by the U.S. Department of Energy. The government has certain rights in the invention.

BACKGROUND

Inexpensive grid scale energy storage is a required to further utilize renewable energy sources (wind, solar). Although redox flow batteries (RFB) are commercially available, the price is still too high for significant adoption. This price, in part, derives from the poor density of energy storage—which is largely attributed to narrow electrochemical window of aqueous media (~1.7v). The most widely deployed commercial system, based on aqueous vanadium based chemistry, has a standard cell potential (vs. SHE) of 1.26V and a low energy density of about 43 $WhL^{-1}$.

SUMMARY

Disclosed herein is a nonaqueous electrolyte composition for use in a redox flow battery system, comprising:

a nonaqueous supporting electrolyte; and an electrochemically active component of formula II:

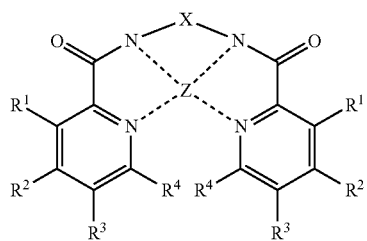

wherein X is an alkanediyl, a substituted alkanediyl, a cycloalkanediyl, a substituted cycloalkanediyl, an aryldiyl, a substituted aryldiyl, a heteroaryldiyl, or a substituted heteroaryldiyl;

each $R^1$-$R^4$ is independently H, alkyl, substituted alkyl, alkoxy, substituted alkoxy, halogen, acyl, substituted carboxyl or ester; and Z is a metal.

Also disclosed herein is a redox flow battery system, comprising:

a nonaqueous electrolyte composition comprising an electrochemically active component of formula II:

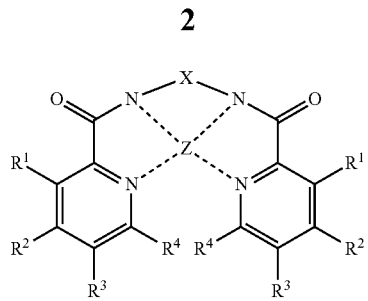

wherein X is an alkanediyl, a substituted alkanediyl, a cycloalkanediyl, a substituted cycloalkanediyl, an aryldiyl, a substituted aryldiyl, a heteroaryldiyl, or a substituted heteroaryldiyl;

each $R^1$-$R^4$ is independently H, alkyl, substituted alkyl, alkoxy, substituted alkoxy, halogen, acyl, substituted carboxyl or ester; and Z is a metal.

Further disclosed herein is a ligand metal complex of formula II:

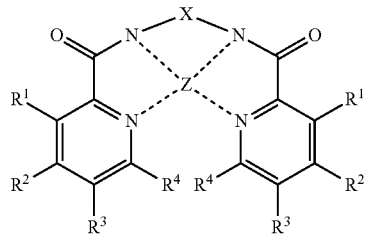

wherein X is an alkanediyl, a substituted alkanediyl, a cycloalkanediyl, a substituted cycloalkanediyl, an aryldiyl, a substituted aryldiyl, a heteroaryldiyl, or a substituted heteroaryldiyl;

each $R^1$-$R^4$ is independently H, alkyl, substituted alkyl, alkoxy, substituted alkoxy, halogen, acyl, substituted carboxyl or ester; and Z is a metal.

provided that X is not —$CH_2$—$CH_2$—$CH_2$—, or at least one of $R^1$-$R^4$ is not a H.

The foregoing will become more apparent from the following detailed description, which proceeds with reference to the accompanying figures.

DETAILED DESCRIPTION

Terminology

Figure 1:
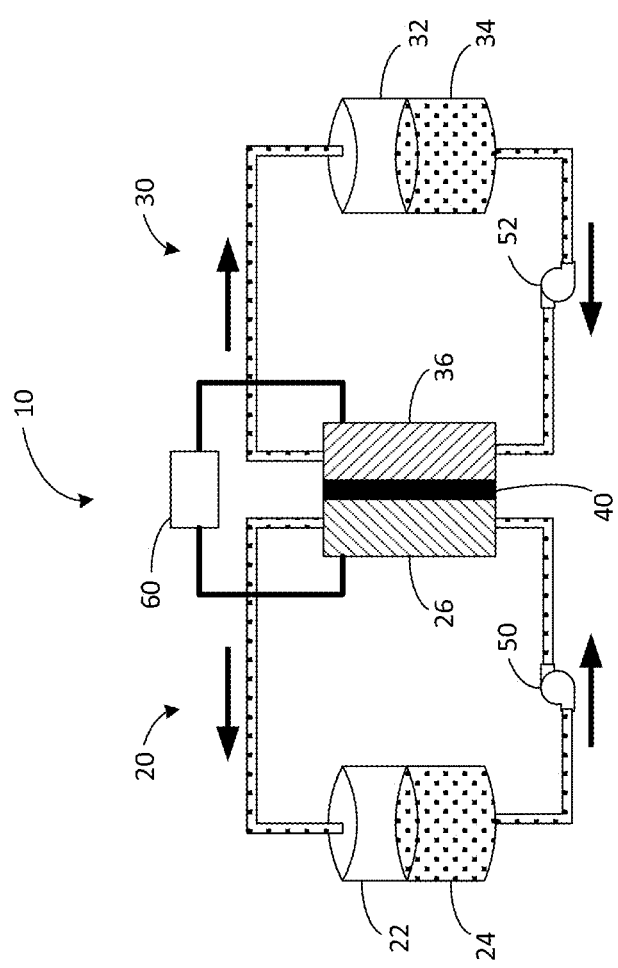
FIG. 1 is a schematic diagram of an exemplary redox flow battery system.
Figure 2:
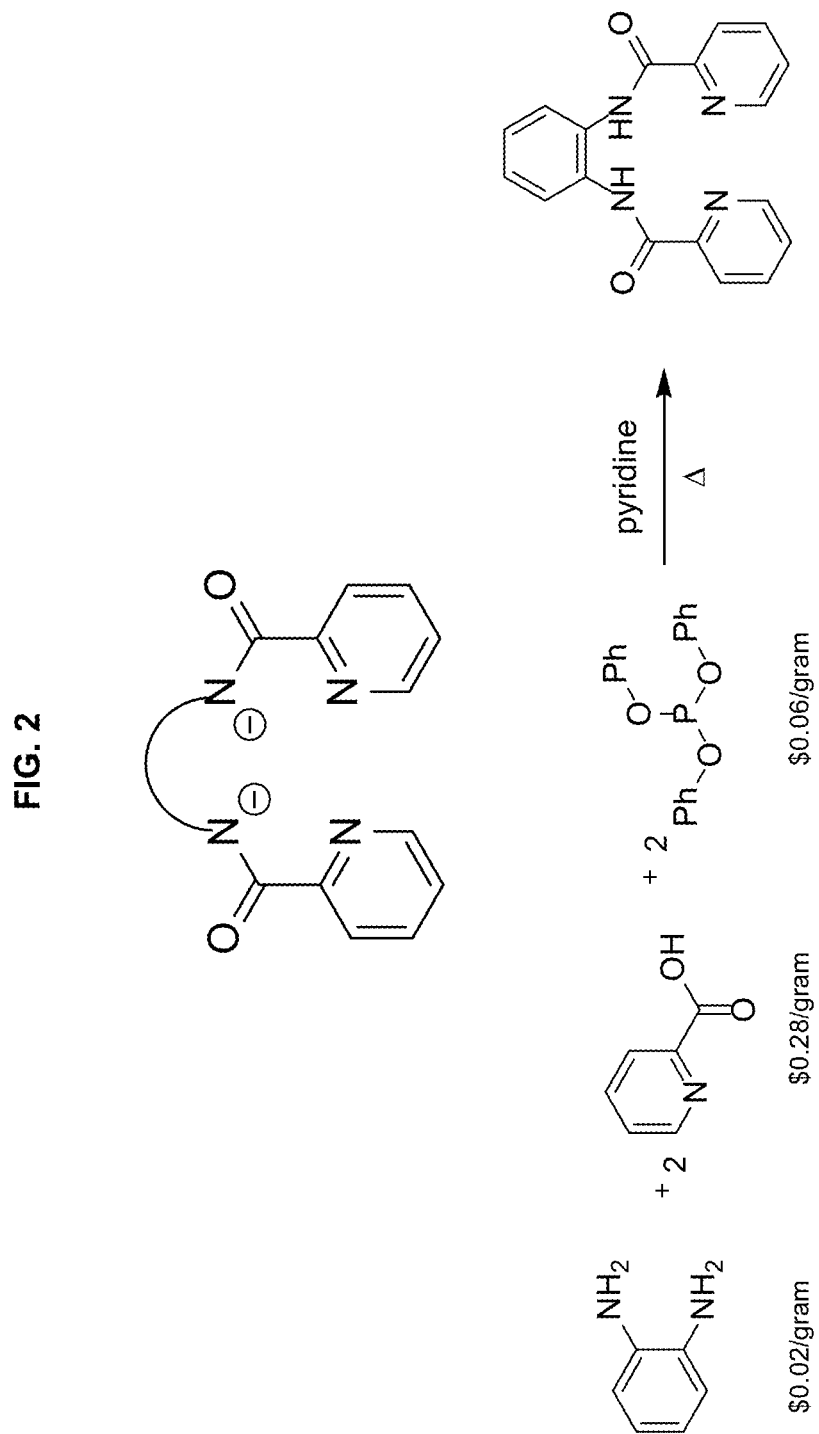
FIG. 2 shows an illustrative ligand and ligand synthesis.
Figure 3:
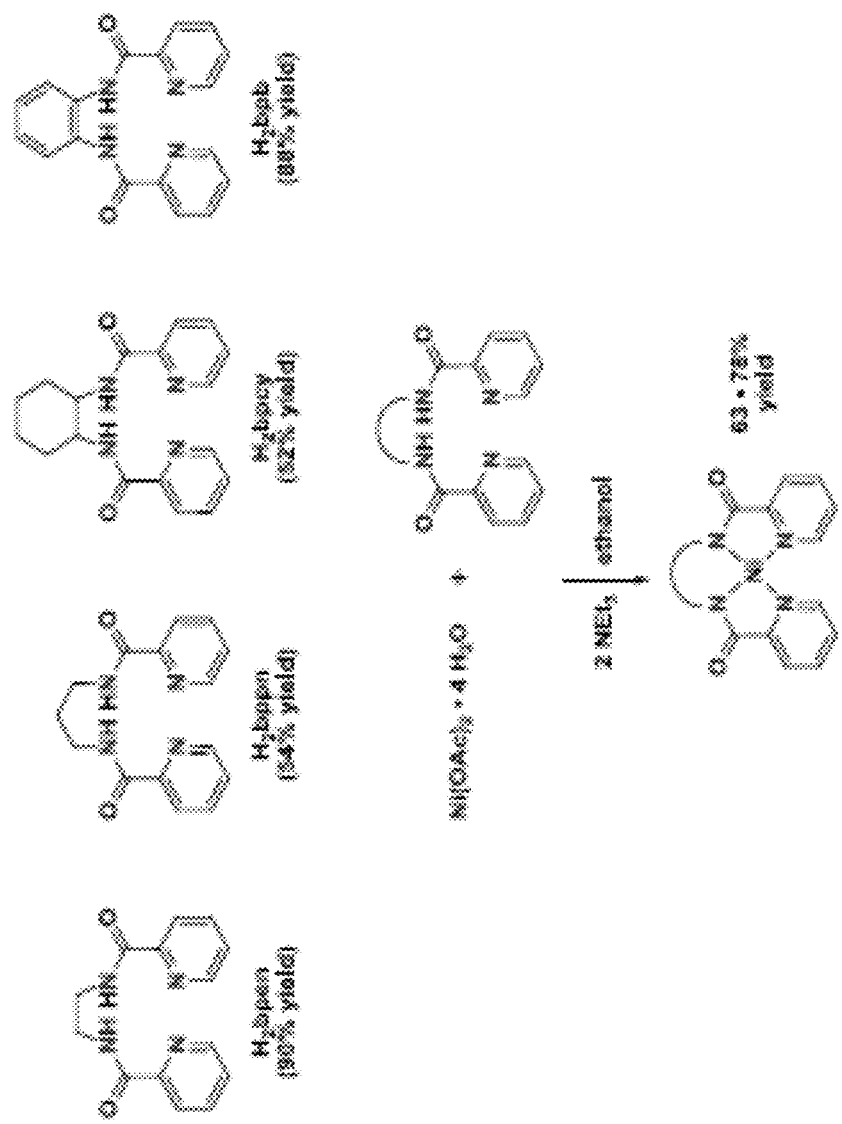
FIG. 3 shows illustrative ligands and illustrative ligand metal complexes.
Figure 4:
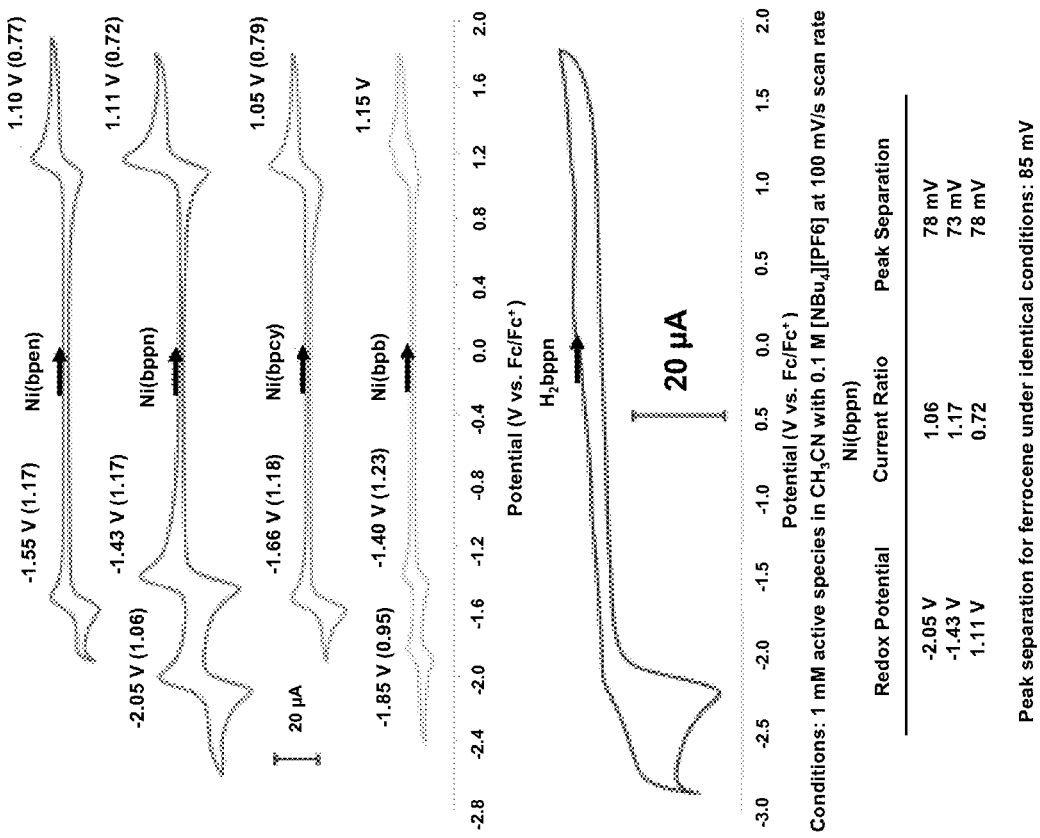
FIG. 4 shows cyclic voltammograms for the complexes.
Figure 5:
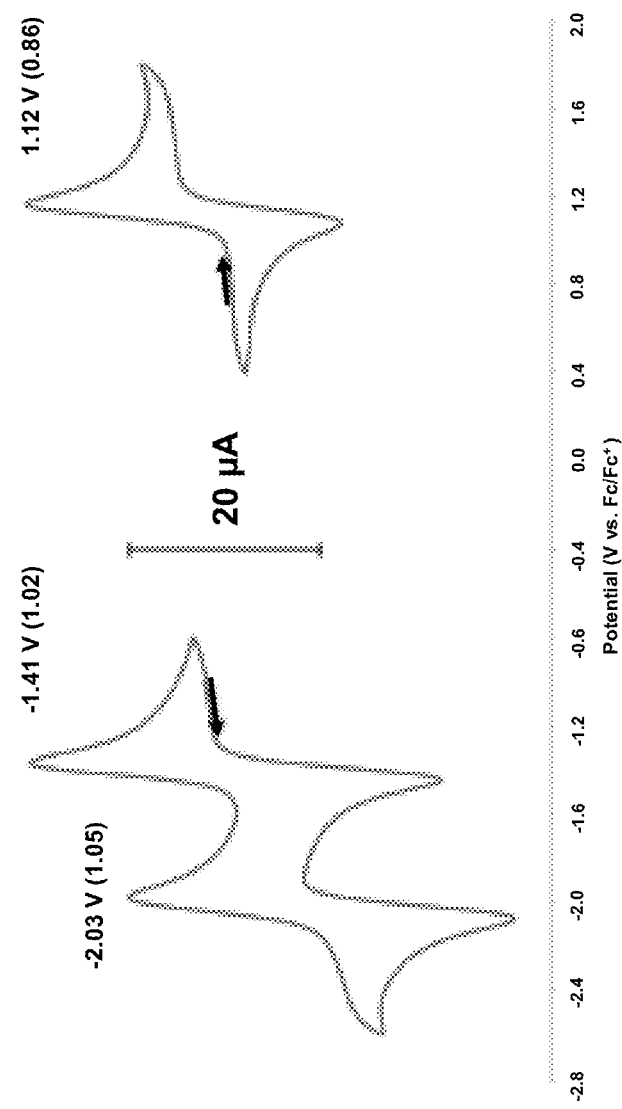
FIGS. 5-7 show cyclic voltammograms for an illustrative complex.
Figure 6:
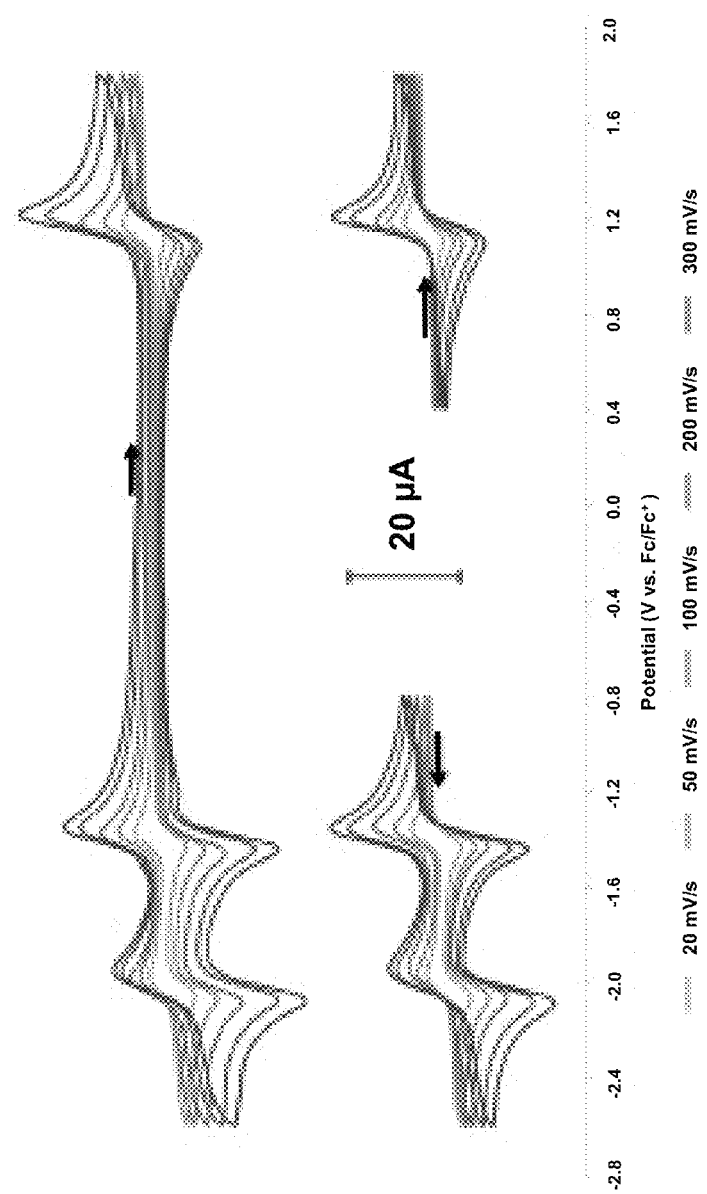
Figure 7:
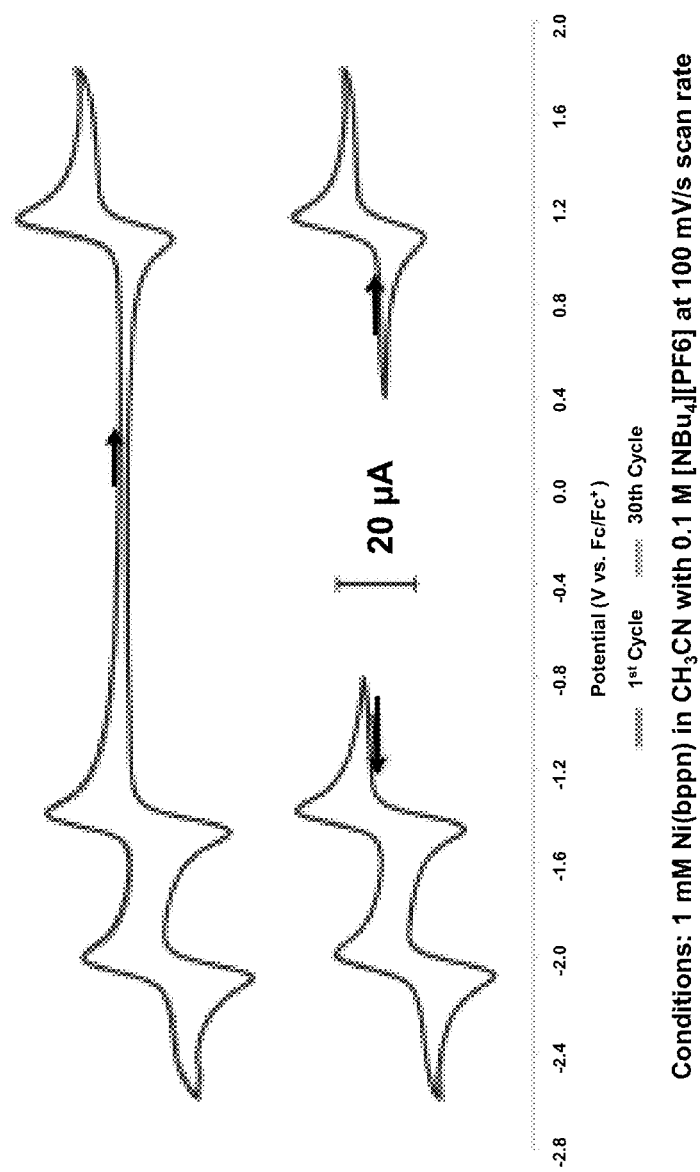
Figure 8:
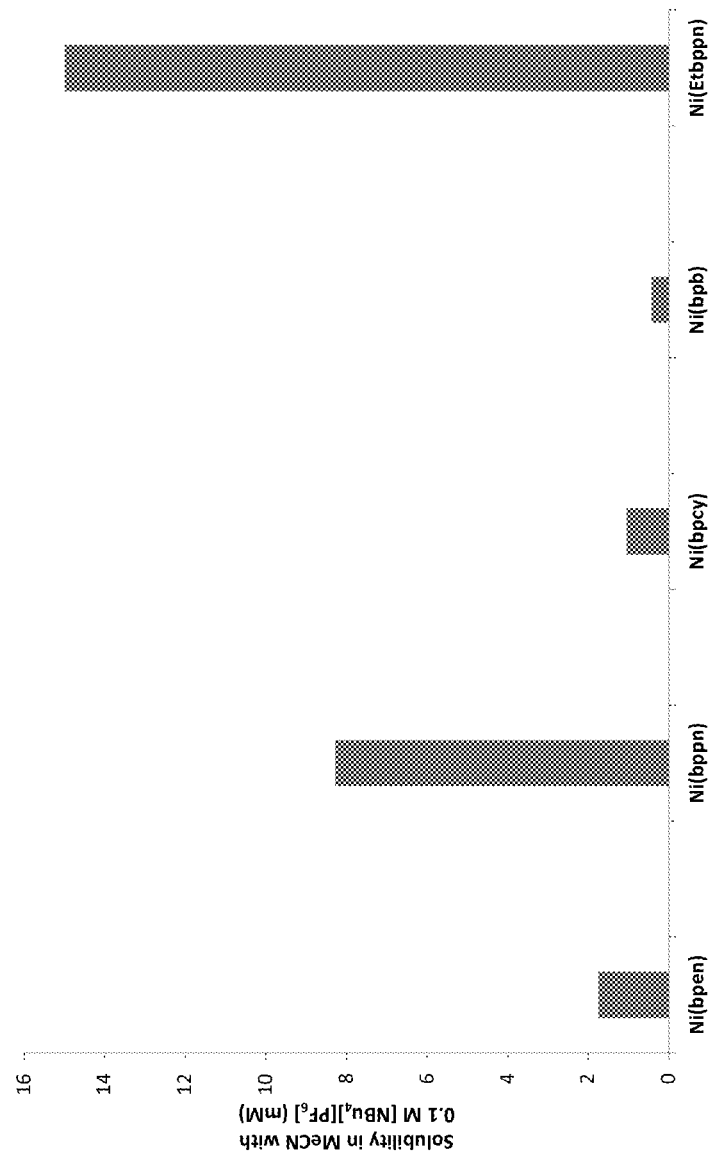
FIG. 8 is a graph depicting the complex solubility in acetonitrile with 0.1 M tetrabutylammonium hexafluorophosphate. In this embodiment, Ni(bppn) has a maximum solubility of 9.1 mM at room temperature and Ni((Etbppn) has a maximum solubility of 15 mM at room temperature.
Figure 9:
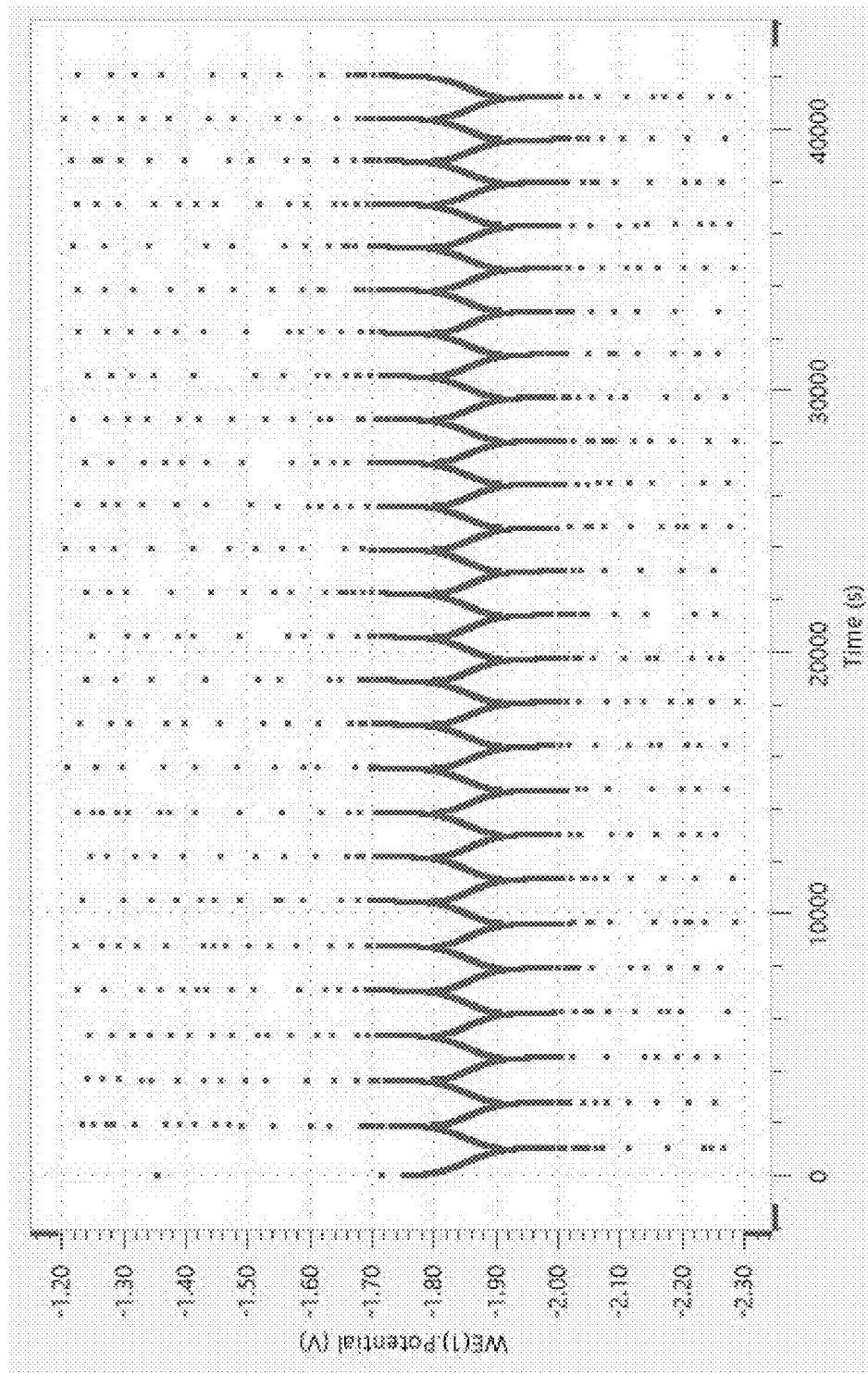
FIG. 9 shows cycling data for an illustrative complex (Ni(bppn)) in acrylonitrile solvent and tetrabutylammonium hexafluorophosphate supporting electrolyte.
Figure 10:
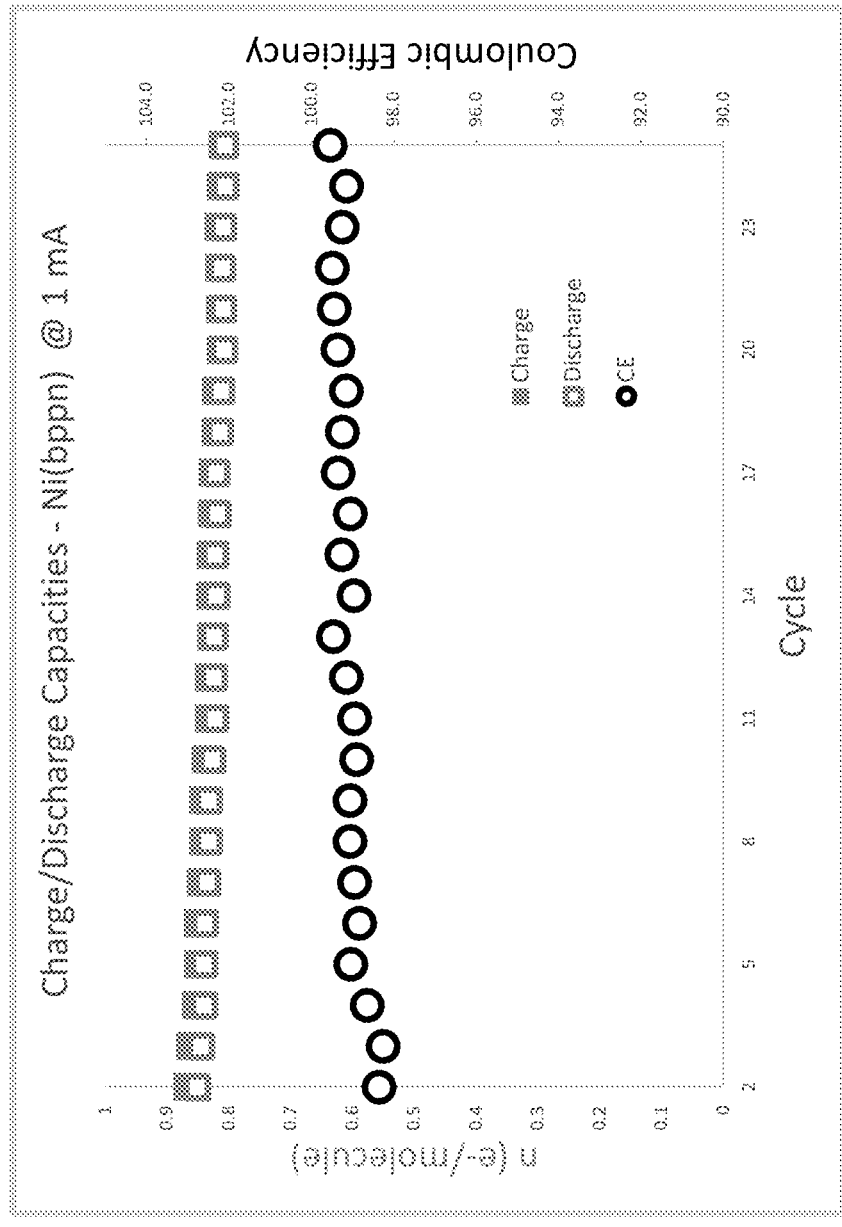
FIG. 10 shows cycling data for an illustrative complex (Ni(bppn)) in acrylonitrile solvent and tetrabutylammonium hexafluorophosphate supporting electrolyte.

The following explanations of terms and methods are provided to better describe the present compounds, compositions and methods, and to guide those of ordinary skill in the art in the practice of the present disclosure. It is also to be understood that the terminology used in the disclosure is for the purpose of describing particular embodiments and examples only and is not intended to be limiting.

"Acyl" refers to a group having the structure —C(O)R, where R may be, for example, optionally substituted alkyl, optionally substituted aryl, or optionally substituted heteroaryl. "Lower acyl" groups are those that contain one to six carbon atoms.

The term "aliphatic" is defined as including alkyl, alkenyl, alkynyl, halogenated alkyl and cycloalkyl groups. A "lower aliphatic" group is a branched or unbranched aliphatic group having from 1 to 10 carbon atoms.

"Alkanediyl," "cycloalkanediyl," "aryldiyl," "alkanearyldiyl" refers to a divalent radical derived from aliphatic, cycloaliphatic, aryl, and alkanearyl hydrocarbons.

The term "alkyl" refers to a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is a saturated branched or unbranched hydrocarbon having from 1 to 6 carbon atoms. Preferred alkyl groups have 1 to 4 carbon atoms. Alkyl groups may be "substituted alkyls" wherein one or more hydrogen atoms are substituted with a substituent such as halogen, cycloalkyl, alkoxy, amino, hydroxyl, aryl, alkenyl, or carboxyl. For example, a lower alkyl or ($C_1$-$C_6$)alkyl can be methyl, ethyl, propyl, isopropyl, butyl, iso-butyl, sec-butyl, pentyl, 3-pentyl, or hexyl; ($C_3$-$C_6$)cycloalkyl can be cyclopropyl, cyclobutyl, cyclopentyl, or cyclohexyl; ($C_3$-$C_6$)cycloalkyl($C_1$-$C_6$)alkyl can be cyclopropylmethyl, cyclobutylmethyl, cyclopentylmethyl, cyclohexylmethyl, 2-cyclopropylethyl, 2-cyclobutylethyl, 2-cyclopentylethyl, or 2-cyclohexylethyl; ($C_1$-$C_6$)alkoxy can be methoxy, ethoxy, propoxy, isopropoxy, butoxy, iso-butoxy, sec-butoxy, pentoxy, 3-pentoxy, or hexyloxy; ($C_2$-$C_6$)alkenyl can be vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl; ($C_2$-$C_6$)alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl; ($C_1$-$C_6$) alkanoyl can be acetyl, propanoyl or butanoyl; halo($C_1$-$C_6$) alkyl can be iodomethyl, bromomethyl, chloromethyl, fluoromethyl, trifluoromethyl, 2-chloroethyl, 2-fluoroethyl, 2,2,2-trifluoroethyl, or pentafluoroethyl; hydroxy($C_1$-$C_6$)alkyl can be hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, or 6-hydroxyhexyl; ($C_1$-$C_6$)alkoxycarbonyl can be methoxycarbonyl, ethoxycarbonyl, propoxycarbonyl, isopropoxycarbonyl, butoxycarbonyl, pentoxycarbonyl, or hexyloxycarbonyl; ($C_1$-$C_6$)alkylthio can be methylthio, ethylthio, propylthio, isopropylthio, butylthio, isobutylthio, pentylthio, or hexylthio; ($C_2$-$C_6$) alkanoyloxy can be acetoxy, propanoyloxy, butanoyloxy, isobutanoyloxy, pentanoyloxy, or hexanoyloxy.

The term "alkoxy" refers to a straight, branched or cyclic hydrocarbon configuration and combinations thereof, including from 1 to 20 carbon atoms, preferably from 1 to 8 carbon atoms (referred to as a "lower alkoxy"), more preferably from 1 to 4 carbon atoms, that include an oxygen atom at the point of attachment. An example of an "alkoxy group" is represented by the formula —OR, where R can be an alkyl group, optionally substituted with an alkenyl, alkynyl, aryl, aralkyl, cycloalkyl, halogenated alkyl, alkoxy or heterocycloalkyl group. Suitable alkoxy groups include methoxy, ethoxy, n-propoxy, i-propoxy, n-butoxy, i-butoxy, sec-butoxy, tert-butoxy cyclopropoxy, cyclohexyloxy, and the like.

"Aryl" refers to a monovalent unsaturated aromatic carbocyclic group having a single ring (e.g., phenyl) or multiple condensed rings (e.g., naphthyl or anthryl), which can optionally be unsubstituted or substituted. A "heteroaryl group," is defined as an aromatic group that has at least one heteroatom incorporated within the ring of the aromatic group. Examples of heteroatoms include, but are not limited to, nitrogen, oxygen, sulfur, and phosphorous. Heteroaryl includes, but is not limited to, pyridinyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, benzimidazolyl, benzooxazolyl, quinoxalinyl, and the like. The aryl or heteroaryl group can be substituted with one or more groups including, but not limited to, alkyl, alkynyl, alkenyl, aryl, halide, nitro, amino, ester, ketone, aldehyde, hydroxy, carboxylic acid, or alkoxy, or the aryl or heteroaryl group can be unsubstituted.

Capacity: The capacity of a battery is the amount of electrical charge a battery can store (charge capacity) and deliver (discharge capacity). The discharge capacity is typically expressed in units of mAh, or Ah, and indicates the maximum charge a battery can produce over a period of one hour. The term "capacity fade" refers to a decrease in the charge capacity over time and result in shorter charge/discharge cycles when the current/voltage is held constant.

The term "carboxylate" or "carboxyl" refers to the group —COO$^-$ or —COOH. The carboxyl group can form a carboxylic acid. "Substituted carboxyl" refers to —COOR where R is alkyl, alkenyl, alkynyl, aryl, aralkyl, cycloalkyl, halogenated alkyl, or heterocycloalkyl group. For example, a substituted carboxyl group could be a carboxylic acid ester or a salt thereof (e.g., a carboxylate).

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. Multiple single cells can form a cell assembly, often termed a stack. A battery includes one or more cells, or even one or more stacks.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle.

The term "cycloalkyl" refers to a non-aromatic carbon-based ring composed of at least three carbon atoms. Examples of cycloalkyl groups include, but are not limited to, cyclopropyl, cyclobutyl, cyclopentyl, cyclohexyl, and the like. The term "heterocycloalkyl group" is a cycloalkyl group as defined above where at least one of the carbon atoms of the ring is substituted with a heteroatom such as, but not limited to, nitrogen, oxygen, sulfur, or phosphorous.

Electrochemically active component: A component (an element, an ion, or a compound) that is capable of forming redox pairs having different oxidation and reduction states, e.g., ionic species with differing oxidation states or a metal cation and its corresponding neutral metal atom. In a flow battery, an electrochemically active component refers to the chemical species that participate in the redox reaction during the charge and discharge processes, significantly contributing to the energy conversions that ultimately enable the battery to deliver/store energy. By "significantly contributing" is meant that a redox pair including the electrochemically active component contributes at least 10% of the energy conversions that ultimately enable the battery to deliver/store energy. In some embodiments, the redox pair including the electrochemically active component contributes at least 50%, at least 75%, at least 90%, or at least 95% of the energy conversions in a catholyte or anolyte comprising the electrochemically active component.

Electrolyte: A substance containing free ions and/or radicals that behaves as an ionically conductive medium. In a redox flow battery, some of the free ions and/or radicals are electrochemically active components. An electrolyte in contact with the anode, or negative half-cell, may be referred to as an anolyte, and an electrolyte in contact with the cathode, or positive half-cell, may be referred to as a catholyte. The anolyte and catholyte are often referred to as the negative electrolyte and positive electrolyte, respectively, and these terms can be used interchangeably. As used herein, the terms anolyte and catholyte refer to electrolytes composed of electrochemically active components and a nonaqueous supporting solution.

Energy efficiency (EE): The product of coulombic efficiency and voltage efficiency. EE=CE×VE.

The term "ester" refers to a carboxyl group-containing moiety having the hydrogen replaced with, for example, a $C_{1-6}$alkyl group ("carboxyl$C_{1-6}$alkyl" or "alkylester"), an aryl or aralkyl group ("arylester" or "aralkylester") and so on. $CO_2C_{1-3}$alkyl groups are preferred, such as for example, methylester ($CO_2Me$), ethylester ($CO_2Et$) and propylester ($CO_2Pr$) and includes reverse esters thereof (e.g. —OCOMe, —OCOEt and —OCOPr).

Half-cell: An electrochemical cell includes two half-cells. Each half-cell comprises an electrode and an electrolyte. A redox flow battery has a positive half-cell in which electrochemically active components are oxidized, and a negative half-cell in which electrochemically active components are reduced during charge. Opposite reactions happen during discharge.

"Substituted" or "substitution" refers to replacement of a hydrogen atom of a molecule or an R-group with one or more additional R-groups. Unless otherwise defined, the term "optionally-substituted" or "optional substituent" as used herein refers to a group which may or may not be further substituted with 1, 2, 3, 4 or more groups, preferably 1, 2 or 3, more preferably 1 or 2 groups. The substituents may be selected, for example, from $C_{1-6}$alkyl, $C_{2-6}$alkenyl, $C_{2-6}$alkynyl, $C_{3-8}$cycloalkyl, hydroxyl, oxo, $C_{1-6}$alkoxy, aryloxy, $C_{1-6}$alkoxyaryl, halo, $C_{1-6}$alkylhalo (such as $CF_3$ and $CHF_2$), $C_{1-6}$alkoxyhalo (such as $OCF_3$ and $OCHF_2$), carboxyl, esters, cyano, nitro, amino, substituted amino, disubstituted amino, acyl, ketones, amides, aminoacyl, substituted amides, disubstituted amides, thiol, alkylthio, thioxo, sulfates, sulfonates, sulfinyl, substituted sulfinyl, sulfonyl, substituted sulfonyl, sulfonylamides, substituted sulfonamides, disubstituted sulfonamides, aryl, ar$C_{1-6}$alkyl, heterocyclyl and heteroaryl wherein each alkyl, alkenyl, alkynyl, cycloalkyl, aryl and heterocyclyl and groups containing them may be further optionally substituted. Optional substituents in the case N-heterocycles may also include but are not limited to $C_{1-6}$alkyl i.e. N—$C_{1-3}$alkyl, more preferably methyl particularly N-methyl.

Voltage efficiency (VE): The voltage produced by the battery while discharging divided by the charging voltage.

Working potential: The electrode potential of a cell constructed with a standard hydrogen electrode and the electrode/redox pair under investigation.

Ligand Metal Complexes

Disclosed herein are ligand metal complexes for inclusion in an electrolyte composition for a non-aqueous redox flow battery (RFB). In particular, the ligand metal complexes can be employed as an electrically active component (e.g., a redox active charge storage material). In certain embodiments, the RFB cell may exhibit over 3 volts.

The complex is formed by linking two picolinic amides via a bridge, and then coordinating the resulting ligand with a metal. The ligand provides multidendate coordination for robust coordination complexes, amide groups that function as electron reservoirs, and low molecular weight for high intrinsic capacity.

In certain embodiments, the ligand has a structure of formula I:

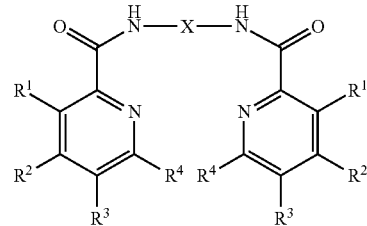

wherein X is an alkanediyl, a substituted alkanediyl, a cycloalkanediyl, a substituted cycloalkanediyl, an aryldiyl or a substituted aryldiyl, a heteroaryldiyl, or a substituted heteroaryldiyl; and each $R^1$-$R^4$ is independently H, alkyl, substituted alkyl (e.g., halogenated alkyl such as trifluoromethyl), alkoxy, substituted alkoxy, halogen, acyl, substituted carboxyl or ester.

In certain embodiments, X is a $C_1$-$C_6$ alkanediyl, or a $C_1$-$C_6$ substituted alkanediyl. In certain embodiments the alkanediyl may be a branched alkanediyl or the substituted alkanediyl may be a substituted branched alkanediyl.

In certain embodiments, X is —$CH_2$—$CH_2$—, —$CH_2$—$CH_2$—$CH_2$—, —$CH_2$—$CH_2$—$CH_2$—$CH_2$—, —$CH_2$—$CH_2$—$CH(CH_2CH_3)$—, —$CH_2$—$C(CH_3)(CH_3)$—$CH_2$, cyclohexanediyl, phenyldiyl, or naphthyldiyl. In certain embodiments, X is pyridinyldiyl, diazinyldiyl, or triazinyldiyl. In certain embodiments, X is —$CH_2$—$CH_2$—CH($CH_2CH_3$)—.

In certain embodiments, at least one of $R^1$-$R^4$ is an alkyl or an alkoxy, particularly a $C_1$-$C_6$ alkyl or $C_1$-$C_6$ alkoxy. In certain embodiments, $R^1$ or $R^4$ is an alkyl or an alkoxy, particularly a $C_1$-$C_6$ alkyl or $C_1$-$C_6$ alkoxy. In certain embodiments, $R^2$ is an alkyl or an alkoxy, particularly a $C_1$-$C_6$ alkyl or $C_1$-$C_6$ alkoxy. In certain embodiments, at least one of $R^1$-$R^4$ is not a H.

Illustrative ligands are shown below.

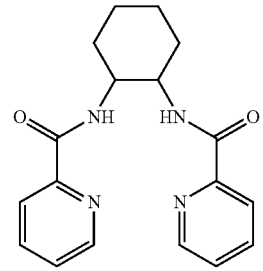

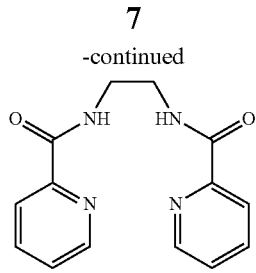

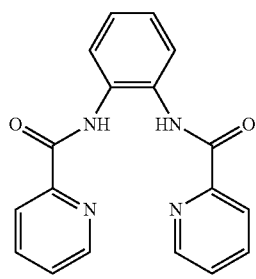

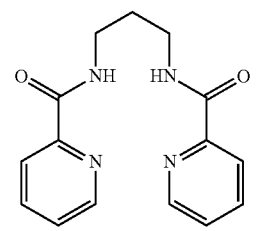

In certain embodiments, the ligand metal complex has a structure of formula II:

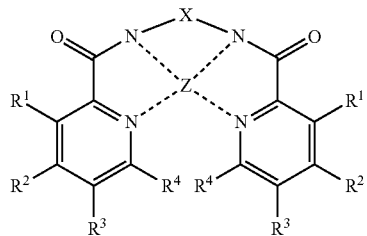

wherein X and $R^1$-$R^4$ are the same as in formula I, and Z is a metal. In certain embodiments, Z is scandium, titanium, vanadium, chromium, manganese, iron, cobalt, nickel, copper, or zinc. In certain embodiments, Z is nickel, iron, cobalt, chromium or zinc. In certain embodiments, Z is nickel. In certain embodiments, Z is iron.

Illustrative ligand metal complexes are shown below.

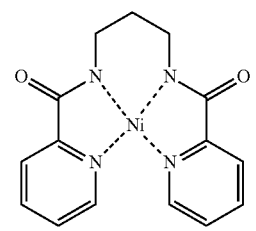

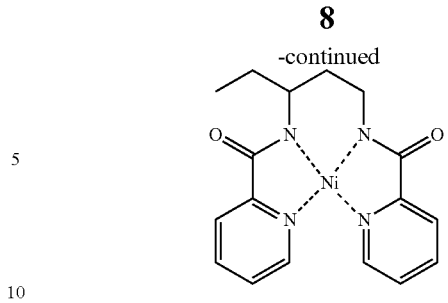

The reactant for forming the bridge between the two picolinic moieties includes two accessible amino groups. Illustrative bridge-forming reactants (i.e. linkers) include 1,3-propanediamine; 1,3-butanediamine; 1,3-pentadiamine; 2,2-dimethyl-1,3-propanediamine; 1,8-diaminonaphthalene; and 2-aminobenzylamine. Illustrative N-heterocycles for forming the ligand include picolinic acid; 4-methylpyridine-2-carboxylic acid; 4-methoxypyridine-2-carboxylic acid; 6-methylpyridine-2-carboxylic acid; and 6-methoxypyridine-2-carboxylic acid.

Redox Flow Battery System

Redox flow batteries (RFBs) can provide electrical energy converted from chemical energy continuously, and are promising systems for energy storage to integrate renewable energies (e.g., solar and/or wind energy) into electrical supply grids. As shown in FIG. 1, a typical RFB system 10 comprises a positive half-cell 20 and a negative half-cell 30. The half-cells are separated by a membrane or separator 40, such as an ion-exchange membrane (cation- or anion-exchange membrane), ion conductive membrane (polymer or ceramic) or porous separator. The positive half-cell 20 comprises an electrode tank 22 containing a catholyte 24 and the negative half-cell 30 comprises an electrode tank 32 containing an anolyte 34. The anolyte and catholyte are solutions comprising electrochemically active components in different oxidation states. The electrochemically active components in the catholyte and anolyte couple as redox pairs. In some embodiments, at least one of the catholyte and anolyte redox active materials remains fully soluble during the charging and discharging cycles of the RFB. However, one member of a redox pair may be insoluble or partially soluble during the charging and discharging cycles of the RFB. For example, when the anolyte comprises a metal cation/metal atom redox pair, only the cation can remain fully soluble during the charging and discharging cycles.

During charging and discharging of the RFB, the catholyte and anolyte are continuously circulating via pumps 50, 52 through the positive and negative electrodes 26, 36, respectively, where redox reactions proceed, providing the conversion between chemical energy and electrical energy or vice-versa. To complete the circuit during use, positive and negative electrodes (including a current collector at each side) 26, 36 of the RFB system 10 are electrically connected through current collectors (not shown) with an external load 60.

Redox flow battery systems include an anode and a cathode. Suitable electrodes include carbon-based electrodes and metal-based electrodes. Suitable metal-based electrodes include, but are not limited to, gold, Pt-coated gold, or Pt-coated carbon-based material. Various catalyst particles, such as Pt and Au, can be deposited on the electrode surface to improve the flow battery performance. Carbon-based materials with different forms and/or structures can also be used, such as porous carbon (e.g., carbon felt, graphite felt), carbon nanotubes, nanowires, and graphene.

The separator can be a polymer, a ceramic, an ion exchange membrane or an ion permeable membrane. Examples of porous separators include Celgard® polypropylene or polyethylene separators, Tonen® separators, Daramic® polyethylene/silica separators, Amer-Sil® polyvinyl chloride/silica separators, polytetrafluoroethylene/silica separators, and TAMI® ceramic filter membranes. Examples of porous membranes include sulfonated fluoropolymers and copolymers, sulfonated polyolefin polymers, and sulfonated aromatic-containing polymers.

In charging, the electrical energy supplied causes a chemical reduction reaction in one electrolyte and an oxidation reaction in the other. The separator between the cathode portion and the anode portion inhibits the electrolytes from mixing but allow selected ions to pass through to complete the oxidation/reduction (redox) reaction. On discharge, the chemical energy contained in the electrolyte is released in the reverse reaction and electrical energy can be drawn from the electrodes.

The electrochemically active species present in the electrolytes are shown below (for a ligand metal complex wherein X is —CH$_2$—CH$_2$—CH$_2$— and Z is Ni):

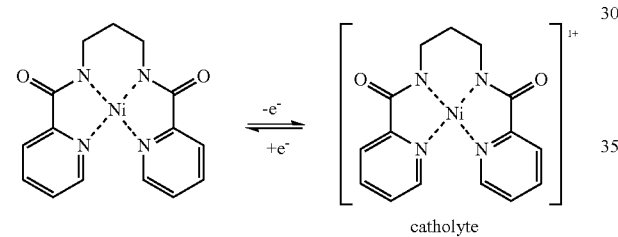

catholyte

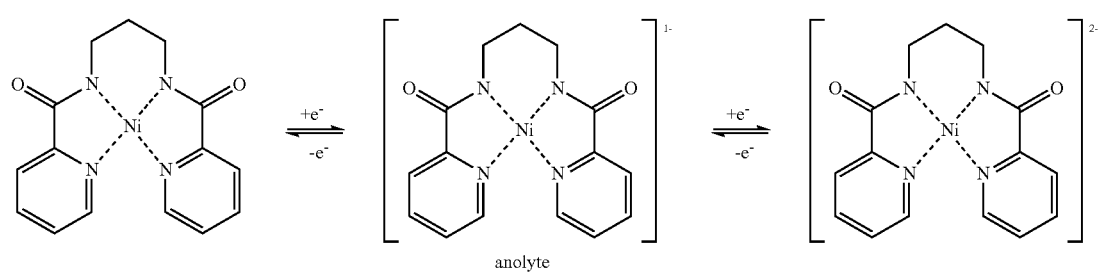

anolyte

In the fully charged state, the catholyte species will be:

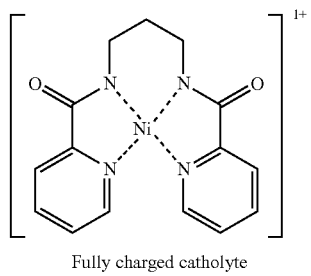

Fully charged catholyte

In the fully charged state, the anolyte species will be:

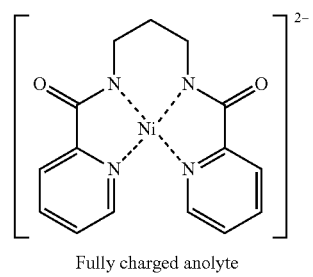

Fully charged anolyte

In the fully discharged state, the catholyte and the anolyte will both include:

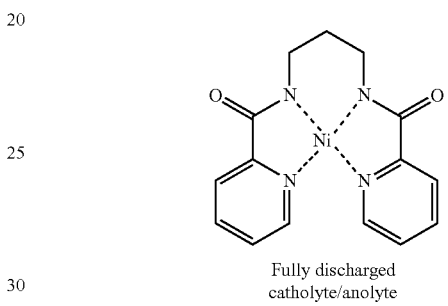

Fully discharged
catholyte/anolyte

The ligand metal complex is present in the electrolyte-containing composition, either with or without a separate solvent. The electrolyte-containing composition may also include at least one supporting electrolyte. In certain embodiments, the ligand metal complex (or species thereof) is present in the electrotype composition in an amount of at least 1 M in all charge states. In certain embodiments, the ligand metal complex (or species thereof) is present in the electrotype composition in an amount of at least 5 mM, preferably in an amount of at least 10 mM, and more preferably in an amount of at least 15 mM, in all charge states. In certain embodiments, the supporting electrolyte is present in the electrolyte-containing composition in an amount of 0.1-0.5 M.

Examples of a non-aqueous solvent include a chain-type carbonate (such as diethyl carbonate, dimethyl carbonate, and dipropyl carbonate), acetonitrile, γ-butyrolactone ("GBL"), a cyclic carbonate (such as propylene carbonate ("PC"), ethylene carbonate ("EC"), and butylene carbonate), N-methyl-2-pyrrolidone ("NMP"), fluoroethylene carbonate, N,N-dimethylformamide ("DMF"), N,N-dimethylacetamide ("DMA"), dimethylsulfoxide ("DMSO"), dichloromethane, chloroform, benzene, toluene, xylene, chlorobenzene, methyl acetate, ethyl acetate, acetone, methyl ethyl ketone, cyclohexanone, diethyl ether, 1,2-dimethoxyethane, 1,2-diethoxyethane, tetrahydrofuran, 1,4-dioxane, methanol, ethanol, and a mixture thereof.

Examples of a supporting electrolyte include $LiBF_4$, $LiPF_6$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), $NaBF_4$, $NaPF_6$, $Na_2SO_4$, tetraethylammonium tetrafluoroborate, tetrabutylammonium tetrafluoroborate, tetrabutylammonium hexafluorophosphate, trimethylsulfonylchloride, and a mixture thereof.

EXAMPLES

Example 1—Preparation of Ni(Bppn) and Cyclic Voltammogram Results 2-picolinic acid was added to a 100-mL RBF and dissolved in 15 mL of pyridine. 1,3-diaminopropane was dissolved in 5 mL of pyridine then added dropwise to solution of 2-picolinic acid. White precipitate formed immediately upon addition. Triphenyl phosphite was added dropwise to the mixture of −10 min. Reaction headed at 100° C. for 4 h. After ~30 min initial precipitate dissolved to give a clear, dark brown solution. After heating completed flask allowed to cool to RT then left to stand.

Pyridine removed from reaction on the vac line to give a dark brown oil. Oil taken up in 20 mL of chloroform then washed with water (3×20 mL), saturated sodium bicarbonate solution (4×20 mL), then water (3×20 mL). Resulting organic layer dried with magnesium sulfate, filtered, then solvent removed to give a light brown oil. With rapid stirring, oil added dropwise to 30 mL of diethyl ether cooled to 0° C. with an ice-water bath. After stirring for 1.5 h white precipitate crashed out of solution. Stirring continued at 0° C. for 4 h then flask moved into the freezer. Precipitate collected via filtration and washed with cold diethyl ether (3×15 mL) then dried under flow of air for ~15 min. Product confirmed by 1H MNR spectrum recorded in CDCl3.

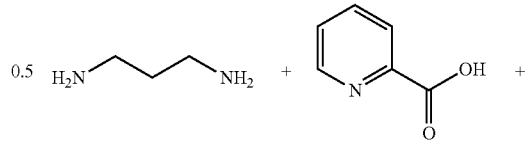

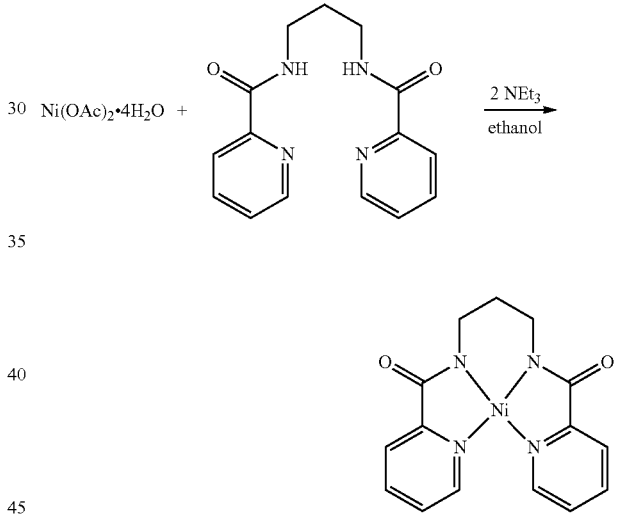

| Reactants: | | | | | | | | | |
|---|---|---|---|---|---|---|---|---|---|
| Reactant | MF | MW | Eq | Moles (mmol) | Sample Mass (g) | Vol (ml) | d (g/ml) | FM | Reactant Mass (g) |
| 1 2-picolinic acid | C6H5NO2 | 123.11 | 1 | 24.5 | 3.0123 | | | 123.11 | 3.0123 |
| 2 1,3-diaminopropane | C3H10N2 | 74.12 | 0.5 | 12.0 | 0.888 | 1 | 0.888 | 74.12 | 0.888 |
| 3 triphenyl phosphite | C18H15O3P | 310.28 | 1 | 24.4 | 7.7578 | 6.4 | 1.184 | 310.28 | |

| Products: | | | | | | | | | |
|---|---|---|---|---|---|---|---|---|---|
| Product | MF | Actual Mass (g) | Actual Mol (mmol) | Yield (%) | Purity | MW | Eq | Theo Mol (mmol) | Theo Mass (g) | FM |
| 1 H2bppn | C15H16N4O2 | 1.8426 | 6.5 | 54.1 | | 384.31 | 0.5 | 12.0 | 3.4062 | 284.31 |

| | | | | Reactants: | | | | | |
|---|---|---|---|---|---|---|---|---|---|
| Reactant | MF | MW | Eq | Moles (mmol) | Sample Mass (g) | Vol (ml) | d (g/ml) | FM | Reactant Mass (g) |
| 1 H2bppn | C15H16N4O2 | 284.31 | 1 | 0.42 | 0.1188 | | | 284.31 | 0.1188 |
| 2 nickel(II) acetate tetrahydrate | C4H14NiO8 | 248.84 | 1 | 0.42 | 0.1042 | | | 248.84 | 0.1042 |
| 3 triethylannine | C6H15N | 101.19 | 2 | 0.86 | 0.0871 | 0.12 | 0.726 | 101.19 | 0.0871 |

| | | | | | Products: | | | | | |
|---|---|---|---|---|---|---|---|---|---|---|
| Product | MF | Actual Mass (g) | Actual Mol (mmol) | Yield (%) | Purity | MW | Eq | Theo Mol (mmol) | Theo Mass (g) | FM |
| 1 Ni(bppn) | C15H14N4NiO2 | 0.0900 | 0.26 | 63.2 | | 340.99 | 1 | 0.42 | 0.1425 | 340.99 |

H2bppn and nickel(II) acetate tetrahydrate were added to a 50-mL RBF and ethanol (10 mL) was added. H2bppn was fully soluble, nickel(II) acetate tetrahydrate partially soluble in ethanol. Triethylamine was added dropwise to the mixture, solution quickly turned red. Reaction headed to 80° C. for 30 min. During course of heating all solids dissolved and small red crystals started crashing out. After heating finished, flask cooled to RT which resulted in more crystals crashing out. Crystals were collected via filtration, washed with cold ethanol (3×10 mL), diethyl ether (3×10 mL) and then left to dry under flow of air.

When complexed with nickel, the resulting species exhibits a promising cyclic voltammogram with reversible redox features at 1.11, −1.44, and −2.05v. If a RFB is made using this charge carrier, the resulting cell will embody two unique features 1) a cell potential >3.0V and 2) the catholyte can store 2 electrons/ligand-metal complex. The higher cell potential and additional electron stored per molecule will increase the energy density of the RFB medium.

Example 2—Preparation of Ni(Etbppn)

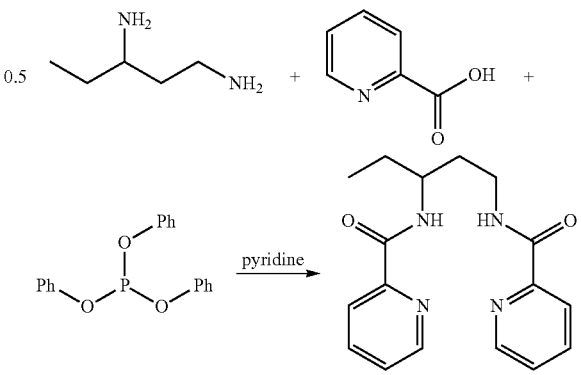

| | | | | | Reactants: | | | | | | |
|---|---|---|---|---|---|---|---|---|---|---|---|
| Reactant | MF | Limit? | MW | Eq | Moles (mmol) | Sample Mass (g) | Vol (ml) | Molarity | d (g/ml) | % Wt | FM | Reactant Mass (g) |
| 1 2-picolinic acid | C6H5NO2 | | 123.11 | 1 | 24.4 | 3.0081 | | | | | 123.11 | 3.0081 |
| 2 1,3-diaminopentane | C5H14N2 | | 102.18 | 0.5 | 12.6 | 1.2825 | 1.5 | | 0.855 | | 102.18 | 1.2825 |
| 3 triphenyl phosphite | C18H15O3P | | 310.28 | 1 | 24.4 | 7.7578 | 6.4 | | 1.184 | | 310.28 | 7.7578 |

| | | | | | Products: | | | | | |
|---|---|---|---|---|---|---|---|---|---|---|
| Product | MF | Actual Mass (g) | Actual Mol (mmol) | Yield (%) | Purity | MW | Eq | Theo Mol (mmol) | Theo Mass (g) | FM |
| 1 H2$^{Et}$bppn | C17H20N4O2 | 2.6034 | 8.3 | 66.4 | | 312.37 | 0.5 | 12.6 | 3.9207 | 312.37 |

2-picolinic acid was added to a 100-mL RBF and dissolved in 15 mL of pyridine. 1,3-diaminopentane was dissolved in 5 mL of pyridine then added dropwise to solution of 2-picolinic acid. Solution turned turbid and after addition was completed an off-white goo was formed. With vigorous stirring triphenyl phosphite was added dropwise to the mixture over ~10 min. Reaction heated at 100° C. for 5 h. Goo dissolved as reaction was heated to give a pale yellow solution that changed to dark green/brown after heating for ~20 min. After heating completed flask allowed to cool to RT then left to stand.

Pyridine removed from reaction on the vac line to give a brown oil. Oil taken up in 20 mL of chloroform then washed with water (3×20 mL), saturated sodium bicarbonate solution (4×20 mL), then water (3×20 mL). Resulting organic layer dried with magnesium sulfate, filtered, then solvent removed to give a brown oil. With rapid stirring, oil added dropwise to 30 mL of diethyl ether cooled to 0° C. with an ice-water bath. After stirring for ~3 hrs no solid crashed out. Flask moved into the freezer.

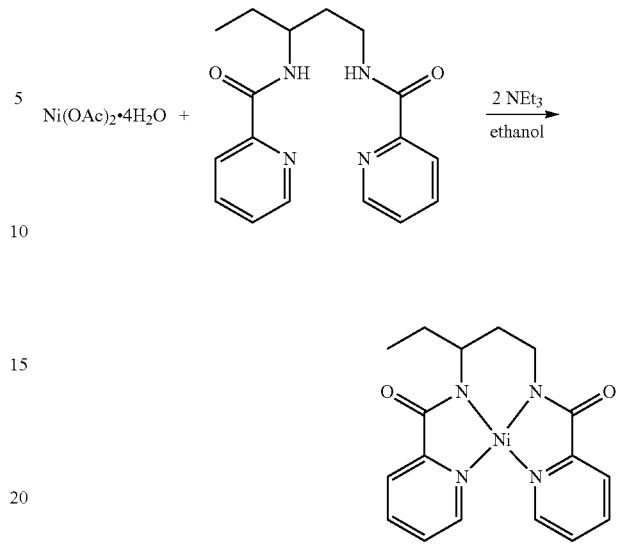

| | | Reactants: | | | | | | | | | | |
|---|---|---|---|---|---|---|---|---|---|---|---|---|
| Reactant | MF | Limit? | MW | Eq | Moles (mmol) | Sample Mass (g) | Vol (ml) | Molarity | d (g/ml) | % Wt | FM | Reactant Mass (g) |
| 1 H$_2^{Et}$bppn | C$_{17}$H$_{20}$N$_4$O$_2$ | ☒ | 312.37 | 1 | 0.55 | 0.1710 | | | | | 312.37 | 0.1710 |
| 2 nickel(II) acetate tetrahydrate | C$_4$H$_{14}$NiO$_8$ | ☒ | 248.84 | 1 | 0.54 | 0.1348 | | | | | 248.84 | 0.1348 |
| 3 triethylamine | C$_6$H$_{15}$N | ☐ | 101.19 | 2 | 1.08 | 0.1089 | 0.15 | | 0.726 | | 101.19 | 0.1089 |

| | | Products: | | | | | | | | |
|---|---|---|---|---|---|---|---|---|---|---|
| Product | MF | Actual Mass (g) | Actual Mol (mmol) | Yield (%) | Purity | MW | Eq | Theo Mol (mmol) | Theo Mass (g) | FM |
| 1 Ni($^{Et}$bppn) | C$_{17}$H$_{18}$N$_4$NiO$_2$ | 0.1008 | 0.27 | 49.9 | | 369.04 | 1 | 0.55 | 0.2020 | 369.04 |

Nothing crashed out after sitting in the freezer overnight. Diethyl ether removed to give back original brown oil. Product need to be separated by column chromatography. Best separation seen with 1:1 hexanes/ethyl acetate.

Reaction mixture separated on 1.75 inch column loaded with ~10 inches of silica gel that was eluted with 1:1 hexanes/ethyl acetate. ~1 liter of solvent mixture needed to elute byproducts. Switched to pure ethyl acetate to elute product. Needed ~1 L to wash all of the compound off the column. Ethyl acetate removed on the rotovap to give a yellow oil. $^1$H NMR spectrum of the oil dissolved in CDCl$_3$ was recorded. Signals consistent with product plus some ethyl acetate and dichloromethane, no impurities detected.

Oil dried under vacuo to remove residual solvent. Heat gun was used to drive off more solvent then oil was left under vacuum for several hours.

$^1$H and $^{31}$P{$^1$H} NMR spectra of the oil was recorded in CDCl$_3$. Signal intensity for ethyl acetate decreased but still present in the $^1$H NMR spectrum. No signals observed in the $^{31}$P{$^1$H} NMR spectrum.

H$_2^{Et}$bppn was added to a 50-mL RBF and dissolved in 15 mL of ethanol. Nickel(II) acetate trihydrate was added to the flask, solution turned orange after stirring for ~5 min. Triethylamine was added dropwise and solution color changed to red. Reaction heated to 80° C. for 30 min. After reaction was completed, flask cooled to room temperature and then solution transferred into a separatory funnel. Reaction solution was extracted with dichloromethane (3×20 mL) and the combined extracts was dried with magnesium sulfate and filtered. Solvent was removed to give a dark red oil that was taken up in THF (8 mL) and moved to the freezer.

Orange powder crashed out of the THF solution. Mother liquor was decanted and powder washed with hexanes (3×2 mL) then dried on the vacuum line for a couple of hours and powder collected.

Solvent was removed from the mother liquor to give back a dark red oil. Oil was dissolved in 4 mL of THF, filtered, transferred to a vial then the vial cap was pierced with a 16G needle and left in the back of the fume hood to allow the THF to slowly evaporate. THF evaporated to leave an orange solid in the vial, no crystalline material.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A nonaqueous electrolyte composition for use in a redox flow battery system, comprising:
   a nonaqueous supporting electrolyte; and
   an electrochemically active component of formula II:

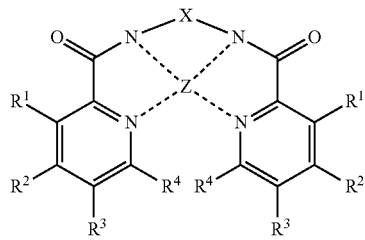

wherein X is an alkanediyl, a substituted alkanediyl, a cycloalkanediyl, a substituted cycloalkanediyl, an aryldiyl, a substituted aryldiyl, a heteroaryldiyl, or a substituted heteroaryldiyl;
   each $R^1$-$R^4$ is independently H, alkyl, substituted alkyl, alkoxy, substituted alkoxy, halogen, acyl, substituted carboxyl or ester; and
   Z is a metal.

2. The composition of claim 1, wherein X is a $C_1$-$C_6$ alkanediyl, or a $C_1$-$C_6$ substituted alkanediyl.

3. The composition of claim 1, wherein the alkanediyl may be a branched alkanediyl or the substituted alkanediyl may be a substituted branched alkanediyl.

4. The composition of claim 1, wherein X is —$CH_2$—$CH_2$—, —$CH_2$—$CH_2$—$CH_2$—, —$CH_2$—$CH_2$—$CH_2$—$CH_2$—, —$CH_2$—$CH_2$—$CH(CH_2CH_3)$—, —$CH_2$—$C(CH_3)(CH_3)$—$CH_2$, cyclohexanediyl, phenyldiyl, or naphthyldiyl.

5. The composition of claim 1, wherein at least one of $R^1$-$R^4$ is an alkyl or an alkoxy.

6. The composition of claim 1, wherein at least one of $R^1$-$R^4$ is a $C_1$-$C_6$ alkyl or $C_1$-$C_6$ alkoxy.

7. The composition of claim 1, wherein $R^1$ or $R^4$ is an alkyl or an alkoxy.

8. The composition of claim 1, wherein $R^2$ is an alkyl or an alkoxy.

9. The composition of claim 1, wherein at least one of $R^1$-$R^4$ is not a H.

10. The composition of claim 1, wherein Z is selected from scandium, titanium, vanadium, chromium, manganese, iron, cobalt, nickel, copper, or zinc.

11. The composition of claim 1, wherein Z is nickel, iron, cobalt, chromium or zinc.

12. The composition of claim 1, wherein Z is nickel.

13. The composition of claim 1, wherein Z is iron.

14. The composition of claim 1, wherein each of $R^1$-$R^4$ is H.

15. The composition of claim 1, wherein the electrochemically active component of formula II is:

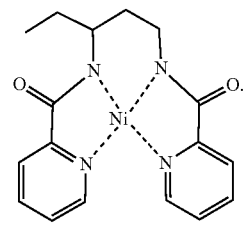

16. A redox flow battery system, comprising:
    the nonaqueous electrolyte composition of claim 1; and
    an ion-exchange membrane or porous separator.

17. The system of claim 16, wherein X is —$CH_2$—$CH_2$—$CH(CH_2CH_3)$—.

18. The system of claim 16, wherein the electrochemically active component of formula II is:

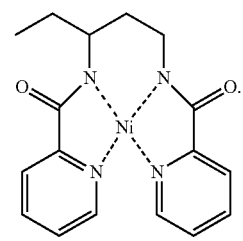

19. A redox flow battery system, comprising:
    a nonaqueous electrolyte composition comprising an electrochemically active component of formula II:

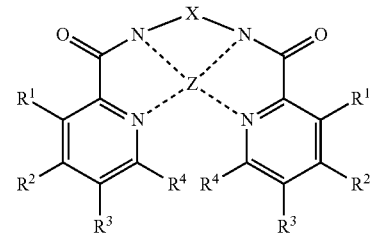

wherein X is an alkanediyl, a substituted alkanediyl, a cycloalkanediyl, a substituted cycloalkanediyl, an aryldiyl, a substituted aryldiyl, a heteroaryldiyl, or a substituted heteroaryldiyl;
    each $R^1$-$R^4$ is independently H, alkyl, substituted alkyl, alkoxy, substituted alkoxy, halogen, acyl, substituted carboxyl or ester; and
    Z is a metal; and
    an ion-exchange membrane or porous separator.

20. A ligand metal complex of formula II:

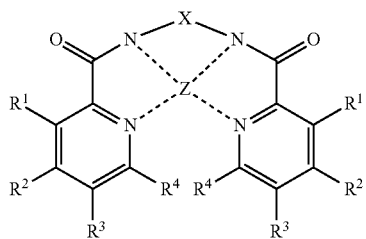

wherein X is an alkanediyl, a substituted alkanediyl, a cycloalkanediyl, a substituted cycloalkanediyl, an aryldiyl, a substituted aryldiyl, a heteroaryldiyl, or a substituted heteroaryldiyl;

each $R^1$-$R^4$ is independently H, alkyl, substituted alkyl, alkoxy, substituted alkoxy, halogen, acyl, substituted carboxyl or ester; and Z is a metal, provided that X is not —$CH_2$—$CH_2$—$CH_2$—, or at least one of $R^1$-$R^4$ is not a H.

21. The complex of claim 20, wherein the complex is:

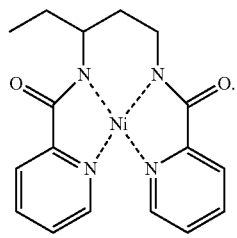

22. The composition of claim 1, wherein the electrochemically active component of formula II is present in the electrolyte composition in an amount of at least 1 M.

23. The composition of claim 1, wherein the electrochemically active component of formula II is present in the electrolyte composition in an amount of at least 5 mM.

24. The system of claim 16, wherein the electrochemically active component of formula II is present in the electrolyte composition in an amount of at least 1 M.

25. The system of claim 16, wherein the electrochemically active component of formula II is present in the electrolyte composition in an amount of at least 5 mM.

* * * * *